United States Patent
Harada et al.

(10) Patent No.: US 9,963,639 B2
(45) Date of Patent: *May 8, 2018

(54) FIXED CARBON PRODUCTION DEVICE

(71) Applicant: KYUSHU ELECTRIC POWER CO., INC., Fukuoka-shi (JP)

(72) Inventors: Tatsuro Harada, Fukuoka (JP); Seiichiro Matsuda, Fukuoka (JP); Isao Mochida, Fukuoka (JP); Jun-ichiro Hayashi, Fukuoka (JP); Yohsuke Matsushita, Fukuoka (JP); Tsuyoshi Yamamoto, Fukuoka (JP)

(73) Assignee: KYUSHU ELECTRIC POWER CO., INC., Fukuoka-shi (JP)

( * ) Notice: Subject to any disclaimer, the term of this patent is extended or adjusted under 35 U.S.C. 154(b) by 532 days.

This patent is subject to a terminal disclaimer.

(21) Appl. No.: 14/427,356

(22) PCT Filed: Sep. 13, 2013

(86) PCT No.: PCT/JP2013/074824
§ 371 (c)(1),
(2) Date: Mar. 11, 2015

(87) PCT Pub. No.: WO2014/042239
PCT Pub. Date: Mar. 20, 2014

(65) Prior Publication Data
US 2015/0247091 A1    Sep. 3, 2015

(30) Foreign Application Priority Data

Sep. 14, 2012 (JP) .................................. 2012-202312

(51) Int. Cl.
*F23J 11/00* (2006.01)
*C10B 39/00* (2006.01)
(Continued)

(52) U.S. Cl.
CPC ................ *C10B 39/00* (2013.01); *C10B 3/00* (2013.01); *C10B 47/20* (2013.01); *C10F 5/06* (2013.01); *F27B 9/36* (2013.01); *Y02P 20/129* (2015.11)

(58) Field of Classification Search
CPC ............ C10B 39/00; C10B 47/20; C10B 3/00
(Continued)

(56) References Cited

U.S. PATENT DOCUMENTS 2,658,743 A * 11/1953 Speil ........................ C03B 3/02
414/162
5,554,201 A    9/1996 Yagaki et al.
5,556,436 A    9/1996 Yagaki et al.

FOREIGN PATENT DOCUMENTS

JP    51-119701 A    10/1976
JP    54-061205 A    5/1979
(Continued)

OTHER PUBLICATIONS

International Search Report dated Oct. 22, 2013 in PCT/JP2013/074824 filed Sep. 13, 2013.

*Primary Examiner* — Monzer R Chorbaji
(74) *Attorney, Agent, or Firm* — Oblon, McClelland, Maier & Neustadt, L.L.P.

(57) ABSTRACT

A fixed carbon production device is provided with: a quench chamber for collecting fixed carbon; a dry distillation furnace which is erected and fixed in the quench chamber and into which raw material coal is fed; a dry distillation unit which is polygonal in horizontal cross-section and is partitioned by a separating wall which partitions the inside of the dry distillation furnace in the vertical direction; a dry distillation mini-furnace which is polygonal in horizontal cross-section and which is partitioned by a partition which partitions the inside of the dry distillation unit in the vertical direction; a pipe heating means which is arranged on the (Continued)

separating wall of the dry distillation unit and the partition of the dry distillation mini-furnace and which dry-distills the raw material coal; and a collection path for collecting fixed carbon collected in the quench chamber.

9 Claims, 5 Drawing Sheets

(51) Int. Cl.
    *C10B 47/20*     (2006.01)
    *C10F 5/06*     (2006.01)
    *F27B 9/36*     (2006.01)
    *C10B 3/00*     (2006.01)

(58) Field of Classification Search
    USPC .................. 422/307–308, 311; 110/234, 345; 34/549
    See application file for complete search history.

(56) References Cited

FOREIGN PATENT DOCUMENTS

| | | |
|---|---|---|
| JP | 02-131540 U | 11/1990 |
| JP | 07-233384 A | 9/1995 |
| JP | 2776278 | 7/1998 |
| JP | 2010-144094 A | 7/2010 |
| JP | 2010-209212 A | 9/2010 |

\* cited by examiner

Temperature change in Loy Yang coal during dry distillation

FIXED CARBON PRODUCTION DEVICE

TECHNICAL FIELD

The present invention relates to a fixed carbon production device which dry-distills dried low rank coal while moving the dried low rank coal in a dry distillation furnace, and which makes it possible to obtain at a high efficiency fixed carbon of a high carbonization ratio at a quench chamber which is a cooled receiving space in the lower portion of the dry distillation furnace.

BACKGROUND ART

The low rank coal, such as subbituminous coal or brown coal, which has a moisture content higher than about 20 mass % is limited to use within a coal-producing region. This is because, for example, the low rank coal has a low calorific value resulting from its high moisture content and generates a small amount of heat by combustion. On the other hand, when dried, the low rank coal becomes more spontaneously combustible and more hygroscopic, resulting in transportation costs being relatively expensive, etc.

However, the low rank coal has advantages that are not found, e.g., in the bituminous coal that is considered to be a high rank coal. For example, brown coal found in Australia and Indonesia is low in sulfur content and produces less ash. Thus, using the brown coal as a fuel would make it possible to prevent air pollution due to sulfur dioxide gas, etc., as well as to reduce hazardous ash waste.

In this context, such techniques have been suggested which are adopted to carbonize the low rank coal by dehydration reform or thermal reform, thereby compensating for the drawbacks thereof. For example, disclosed in Patent Literature 1 and Patent Literature 2 is a technique by which oil and low rank coal are mixed to obtain raw material slurry; the resulting slurry is heated and dehydrated in the oil, and then further heated to decompose or detach the carboxyl radical or the hydroxyl radical, etc., in the raw material coal by a decarboxylation reaction or a dehydration reaction, thereby reforming the raw material coal. Also disclosed is a technique by which heavy oil, etc., is penetrated into pores of the low rank coal so as to prevent spontaneous combustion.

Further, disclosed in Patent Literature 3 is a method for manufacturing reformed coal and hydrocarbon oil by thermally decomposing brown coal into reformed coal and tar under an inert gas atmosphere or steam atmosphere and catalytically cracking the tar in a steam atmosphere and in the presence of an iron-based catalyst so as to obtain hydrocarbon oil.

Disclosed in Patent Literature 4 is a fixed carbon recycle device in which a plurality of lines are arranged for recycle in recycling the fixed carbon, whereby the flows of the powder materials serve to complement each other, thereby eliminating clogging.

CITATION LIST

Patent Literature

PTL 1: Japanese Published Unexamined Patent Application No. H07-233384
PTL 2: Japanese Patent No. 2776278
PTL 3: Japanese Published Unexamined Patent Application No. 2010-144094
PTL 4: Japanese Published Unexamined Patent Application No. 2010-209212

SUMMARY OF INVENTION

Technical Problem

However, the above conventional techniques had the following problems:

(1) For Patent Literatures 1 and 2, the use of oil requires various types of facilities for separating oil and coal in the same container, causing an increase in the size of the system and hindering energy-saving efficiency;

(2) The oil or an indirect material is required for the reforming of the coal, thereby causing a significant increase in costs and imposing a high environmental load;

(3) The method which employs the oil causes a heat exchange loss of the energy provided for the brown coal, thus leading to a significant energy loss;

(4) Furthermore, the oil used as an indirect material is mixed into the dried coal, thus causing a high loss of oil and hindering resource-saving efficiency; and (5) For Patent Literature 3, the brown coal is thermally decomposed at 500° C. to 800° C. to obtain the reformed coal and the tar, and then the tar is catalytically cracked at 400° C. to 600° C. to thereby obtain the reformed coal and a compound. However, in general, when the low rank coal is heated above 500° C., cracks are increased and fine powder is produced, causing unburned coal to increase. Furthermore, since the thermally decomposed gas may increase the risk of easily igniting combustible components or explosion of the powdered coal in a high oxygen concentration, safety and operability are lacking because it is difficult to control the operations of the system such as the control of oxygen concentration or addition of steam.

The present invention aims to solve the above conventional problems. It is an object of the present invention to provide a fixed carbon production device having the following features:

(1) As the dry distillation furnace, there is adopted a moving bed indirect heating dry distillation furnace, whereby the temperature of the product gas may be kept reduced and thus fewer restraints are imposed on materials such as those for gas pipes, thereby providing excellent maintainability;

(2) The thermal decomposition temperature is as low as 350° C. to 500° C., so that there are few restraints in terms of the compositional materials of the system including the input and output sides of the fixed carbon production device. Further, since the input heat value is low, the device is excellent in energy-saving efficiency;

(3) The thermal decomposition temperature is low, and it is possible to perform dry distillation while maintaining the tar component, so that it is possible to solve problems due to the tar component (such as adhesion or caulking). Thus, the device is excellent in operation stability and safety;

(4) A pipe-shaped heating means is provided, and indirect heating by high temperature heat medium such as steam is performed, so that it is possible to make the device volume compact. Further, in the case where there is provided a combustion means for burning dry distillation gas and fixed carbon, it is possible to utilize waste heat, exhaust gas, and steam of the combustion means, so that the device is excellent in energy-saving efficiency;

(5) In the case where oxygen combustion is adopted, when the carbon dioxide gas is separated and recycled, the amount of nitrogen gas is considerably small, so that the concentration of the carbon dioxide gas is high, and it is possible to reduce the carbon dioxide gas separation energy; and (6) It is possible to effectively utilize the exhaust heat of a boiler, etc., so that the device is excellent in thermal decomposition and resource-saving efficiency; and since no indirect material such as oil is added, the device is light, and the transportation costs are low, making it possible to reform subbituminous coal, brown coal, etc., which are of high moisture content and difficult to use in places other than the point of origin, into fixed carbon such as high rank char, making it possible to use the coal in places other than the coal-producing region. Further, as compared with the case where brown coal, etc., the moisture content of which is about 60%, is transferred, since fixed carbon, which is of lowered moisture content, is transferred, it is possible to provide excellent transfer efficiency.

Solution to Problem

To solve the above conventional problems, a fixed carbon production device of the present invention is arranged as described below.

A fixed carbon production device according to a first aspect of the present invention is arranged to include: a quench chamber for collecting fixed carbon; a dry distillation furnace which is erected and fixed in the quench chamber; a dry distillation unit which is partitioned into a rectangular or a polygonal shape in the vertical direction on a horizontal cross-section in the dry distillation furnace by a separating wall from an upper portion to a lower portion; a dry distillation mini-furnace which is partitioned into a rectangular or a polygonal shape in the vertical direction on the horizontal cross-section in the dry distillation unit by a partition from an upper portion to a lower portion; a pipe-shaped heating means which is arranged on the separating wall of the dry distillation unit and the partition of the dry distillation mini-furnace; and a collection path for collecting fixed carbon produced in the quench chamber by feeding raw material coal from the upper portion of the dry distillation unit and performing dry distillation in each of the dry distillation mini-furnaces by the pipe-shaped heating means.

As a result of this arrangement, the following effects are achieved:

(1) Since each dry distillation mini-furnace is equipped with a pipe-shaped heating means, indirect heating by a high temperature heat medium is possible; and heating is easily performed substantially uniformly without generating heat gradient in the dry distillation furnace, and the device provides an excellent yield of fixed carbon. Since there are arranged in many rows dry distillation units each equipped with many rows of dry distillation mini-furnaces, the device is excellent in mass productivity. Further, conventionally, when the inner volume of the furnace is simply increased for mass production, it is difficult to make the temperature in the furnace uniform, and there are generated places where dry distillation partially progresses easily, etc.; and the yield of the high-quality fixed carbon is low, the interior of the dry distillation furnace is subdivided, with each subdivided flow path being equipped with a heating means, so that it is possible to substantially improve the dry distillation efficiency;

(2) There are provided dry distillation units each formed with many rows of dry distillation mini-furnaces, and a dry distillation furnace formed with many rows of dry distillation units, so that the device exhibits high rigidity; it undergoes no deformation even when pressure is applied to the inside of the furnace due to generation of a volatile component in the dry distillation furnace or due to expansion of the raw material coal in the dry distillation furnace; thus, the device is excellent in operation stability;

(3) Upon entering in the dry distillation furnace, low rank coal expands due to moisture content, so that it is possible to prevent the coal from being allowed to pass through without undergoing any reaction, resulting in excellent stability in quality;

(4) Fixed carbon being delivered is accumulated in the quench chamber; thus, the reaction makes it possible to progress through trapping there, resulting in excellent stability in quality;

(5) Since the heating means is formed in a pipe-shape, it is possible to perform heating in a stable manner by means of high temperature heat medium such as steam, so that the device is excellent in operation stability;

(6) The quench chamber for collecting fixed carbon is provided in the lower portion of the dry distillation furnace, so that it is possible to cool the fixed carbon reformed in the dry distillation furnace;

(7) In the case of a complex system performing power generation by using hydrocarbon gas generated in a fixed carbon production device, the combustion heat of the hydrocarbon gas is utilized for the heating of the steam for power generation, and for the drying, heat decomposition, gasification of the low rank coal, and the production of fixed carbon;

(8) The heating means makes it possible to effectively utilize the exhaust heat of the boiler, so that the device is excellent in resource-saving efficiency. Further, since no indirect material such as oil is added, the device is light, and the transportation costs are low, making it possible to utilize subbituminous coal, brown coal, etc., which are of high moisture content and difficult to use in places other than the point of origin, at places other than the coal-producing region; and (9) Since the device has a pipe-shaped heating means, unlike direct heating in which exhaust gas from the combustor is supplied as the heat exchange medium for the dry distillation furnace, it is possible to utilize to the utmost the heat value per unit volume of the volatile content generated by using indirect heating, thus making the device excellent in energy-saving efficiency.

Here, as an example of the dry distillation furnace, there is preferably used one of a size of about 4500 mm in the vertical direction×about 4500 mm in the lateral direction and of a height of about 5000 mm. Therein, preferably, there are provided separating walls such that one dry distillation unit is of a size of about 1500 mm in the vertical direction×about 1500 mm in the lateral direction and of a height of about 5000 mm, with 3×3 rows of dry distillation units being provided in the dry distillation furnace; further, in this dry distillation unit, there are provided partition plates each being of a size in cross-section of about 500 mm in the vertical direction×about 500 mm in the lateral direction and of a height of about 5000 mm, with 3×3 rows of dry distillation mini-furnaces being provided in the dry distillation unit. The cross-section shape of the dry distillation furnace is not restricted to a rectangular one; it is also possible to use as appropriate polygonal ones such as triangular, pentagonal or hexagonal ones. Further, it is possible to perform tests by using the dry distillation mini-furnace as a dry distillation furnace; thus, the device is applicable from small to large systems, which is excellent in terms of the degree of freedom in design and expandability.

As the separating walls and partition plates, there are preferably used ones which are arranged so as to partition each dry distillation unit and each dry distillation mini-furnace from the upper portion to the lower portion, with a heating means for controlling temperature in the partitioned interiors being provided. The heating means may be arranged successively from the upper portion of the partition plate so as to divide it into a plurality of stages. In the case where the heating means is divided into a plurality of stages, it is possible to adjust temperature at each stage so as to make rapid or gentle the dry distillation rate in the dry distillation step, thus controlling the heating pattern; this facilitates the setting of conditions for obtaining high rank coal with high efficiency, thus making the device excellent in productivity.

It is desirable for the quench chamber for collecting fixed coal to perform cooling to a temperature not higher than room temperature. This makes possible the prevention of oxidation of the fixed carbon. Further, as the structure of the quench chamber, it is desirable to employ a structure receiving the fixed carbon in a hermetic state. The interior of the quench chamber is filled with inert gas to thereby prevent oxidation of the dry-distilled coal; at the same time, the dry-distilled coal is cooled indirectly to room temperature by a water-cooling heat conduction pipe installed in the container, thereby obtaining fixed carbon. As the structure for receiving the fixed carbon in a hermetic state, it is desirable to employ, both on the receiving side from the dry distillation furnace and on the extraction port side for the fixed carbon, a valve of a structure such as a rotary valve which seals both the dry distillation furnace and the cooling bath. In this way, it is possible to place the cooling bath in a hermetic state through indirect heating, making it possible to create an inert gas atmosphere, so that it is possible to prevent an accident such as ignition, which is desirable.

As the bottom portion of the quench chamber for collecting fixed carbon, there is preferably employed one the angle of which is not less than an angle of repose. As the angle becomes less than an angle of repose, a bridge of fixed carbon is likely to be generated in the quench chamber, and there is a tendency of making it difficult to smoothly extract the fixed carbon from the fixed carbon extraction port in the lower portion, which is undesirable.

As a pipe-shaped heating means, it is possible to preferably employ finned steam piping. This makes it possible to provide a satisfactory heat exchange efficiency, and efficiently heat the interior of the furnace. As the method for arranging the pipe-shaped heating means, it is not only possible to arrange it through fixing or soldering to the separating wall or the partition plate but also to arrange the pipe-shaped heating means directly on the separating wall or the partition through machining. This makes it not only possible to conduct heat to the interior of the furnace through the wall surface uniformly, but also to reinforce the separating wall and the partition plate, enhancing the rigidity as a whole.

Further, as the pipe-shaped heating means, which performs indirect heating by using a heat medium such as steam, the heating means may also be mounted so as to be parallel to the separating wall or the partition, or may be mounted orthogonally thereto so as to pierce through the partition plate or the separating wall; in the case of orthogonal mounting, the heating means itself serves as a baffle plate, causing the dried coal to flow down by itself; it is also possible to appropriately trap it when dry-distilling it, thus leading to an improvement in quality at the time of dry distillation, which is desirable.

As the raw material coal, dried brown coal is preferably employed. Apart from brown coal, it is also possible to employ lignite, subbituminous coal, etc., in the same manner. Examples of the brown coal that may be employed in the same manner include Victoria coal, North Dakota coal, and Berger coal, etc. While these kinds of coal have desirable properties of low ash and low sulfur content, they tend to be of high moisture content because of their porosity; since they contain a lot of moisture, they are of low calorific value, and are treated as low rank coal. These kinds of coal of high porosity and high moisture content may be employed in the same manner. (Hereinafter, these kinds of coal will be generally referred to as low rank coal. Regarding low rank coal of high moisture content to be dried, these kinds of coal are acceptable regardless of their names and origin as long as their moisture content exceeds about 20%.)

As the dry distillation temperature, a temperature of 300° C. to 900° C., more preferably, 300° C. to 800° C., is preferably employed. This allows for reducing use of special materials that withstand high temperatures as the furnace material. The dried coal is inserted from the furnace top of the dry distillation furnace, and the particles of the dried coal expand, and then contract while successively falling due to gravity; in this process, the particles continuously come into contact with high temperature steam, nitrogen gas, or carbon dioxide gas in the form of a countercurrent or parallel current with respect to the particles, whereby dry distillation is performed, and it is possible to obtain fixed carbon. Further, the gas fed into the furnace may utilize a wide range of flow velocity. In general, it is difficult to make the in-bed temperature uniform; however, the present invention is provided with a dry distillation unit and a dry distillation mini-furnace in the dry distillation furnace, and the wall surface of each of them is equipped with a pipe-shaped heating means, so that it is possible to make the temperature in each bed uniform, making it possible to enhance the yield of fixed carbon.

When there is provided a combustion means using as the fuel hydrocarbon gas or fixed carbon produced by the fixed carbon production device, there is preferably employed, as the combustion means, a fluidized bed combustor, or a hydrocarbon-gas/fixed-carbon combustion boiler.

In the fluidized bed combustor, employed as a bed material is limestone or dolomite, etc. As a fuel additive, preferably employed is a mixed gas of oxygen and carbon dioxide gas for adjusting (diluting) the concentration of oxygen. The fuel used is dried coal of the low rank coal that has been dried in the drying unit, reformed coal of the low rank coal that has been reformed in the reformer or char.

Further, the combustion temperature of the fluidized bed combustor is controlled at 800° C. to 900° C. This allows for reducing use of special materials that withstand high temperatures as the furnace material and for preventing problems such as melting of ash in the fluidized bed.

The catalyst reforming unit performs reforming by allowing the volatile component obtained from the low rank coal or a producer gas (combustion exhaust gas) such as $CO_2$, CO, and $H_2O$ to be brought into contact with the catalyst, thereby yielding, such as, an FT synthesis gas, methanol synthesis gas, ammonia synthesis gas, hydrogen gas, or synthetic natural gas.

Furthermore, a produced tar component may be reformed to continually obtain low molecular-weight hydrocarbon, carbon monoxide, and hydrogen.

The invention according to a second aspect is the fixed carbon production device according to the first aspect, wherein a heating temperature of the dry distillation furnace is of 350° C. to 500° C.

As a result of this arrangement, in addition to the effects obtained by the first aspect, it is possible to obtain the following effects:

(1) Since dry distillation is performed at a low temperature of 350° C. to 500° C., the hydrocarbon gas (volatile content) is removed, and this makes it possible to convert to high rank coal, making it possible to obtain a high rank coal of a fuel ratio of 2 or more;

(2) Since it is possible to perform dry distillation at low temperature, the device is excellent in cost-saving efficiency in terms of the cost of the device itself and the input heat value;

(3) Further, since the thermal decomposition temperature is low, there are few restraints regarding the compositional material of the system inclusive of the input side and the output side of the fixed carbon production device; thus, the device is excellent in safety and the degree of freedom in device design; and (4) Further, since the thermal decomposition temperature is low, and it is possible to perform dry distillation while maintaining the heavy oil component such as tar, it is possible to solve the problems due to the heavy oil component (such as adhesion, caulking, or clogging of the reactor); thus, the device is excellent in operation stability and safety.

Here, as the heating temperature of the dry distillation furnace, a temperature of 350° C. to 500° C. is preferably employed. Preferably, a temperature of 350° C. to 450° C. is preferably employed. When the heating temperature is below 350° C., the fuel ratio is rather low, which is not desirable; on the other hand, when the heating temperature exceeds 450° C., there is a tendency of the effect with respect to the input heat value being reduced, which is not desirable. Further, as the heating temperature increases, the amount of hydrocarbon gas (volatile content) removed through dry distillation increases, and this accompanies an increase in heavy oil; as a result, there is a tendency for problem such as clogging of the reactor being aggravated, which is also undesirable. Thus, through performing temperature control in the range of 350° C. to 450° C., it is possible to perform dry distillation while retaining heavy oil in the fixed carbon, so that there are no problems such as the clogging of the reactor, thus greatly contributing to safe operation. Further, in general, when the low rank coal is heated above 500° C., cracks are increased and fine powder is produced, causing unburned coal to increase; since the thermally decomposed gas may increase the risk of easily igniting combustible components or explosion of the powdered coal in a high oxygen concentration, safety and operability are lacking because it is difficult to control the operations of the system such as the control of oxygen concentration or addition of steam.

As a result of the removal of the hydrocarbon gas (volatile content), conversion to high rank coal progresses; however, it is known that the hydrocarbon gas component is removed also within a temperature range of 100° C. to 300° C.; and that, at a temperature of about 400° C., the fuel ratio of 2 of high-quality Newlands coal is exceeded; thus, as is understood, it is possible to produce a fixed carbon of a high rank coal level currently on the market.

Further, as compared with the conventionally general high temperature dry distillation, the temperature is much lower, which is 350° C. to 500° C., so that the device is excellent in energy-saving efficiency and labor-saving efficiency.

The invention according to a third aspect is the fixed carbon production device according to the first or second aspect, wherein there are arranged in the dry distillation mini-furnace, a baffle plate, a metal mesh, and a metal plate with holes.

As a result of this arrangement, in addition to the effects obtained according to the first or second aspect, it is possible to obtain the following effects:

(1) Since a baffle plate, a metal mesh, a metal plate with a lot of holes, etc., (hereinafter referred to as a baffle plate, etc.) are arranged in the dry distillation mini-furnace, it is possible to appropriately arrange the baffle plate, etc., for the purpose of adjusting the flow velocity of the raw material coal for each dry distillation mini-furnace, making it possible to stabilize unevenness in products and the yield of the fixed carbon; thus, the device provides excellent product yield;

(2) Since a baffle plate, etc., is arranged in the dry distillation furnace, it serves as a reinforcing member inside the furnace, so that the device provides excellent strength;

(3) Further, the baffle plate, etc., are warmed to thereby contribute to making the temperature in the dry distillation furnace uniform, so that the device provides excellent product yield; and (4) Due to the presence of the baffle plate, etc., there is no fear of the raw material coal fed from the upper portion being allowed to pass through the dry distillation furnace, so that the device provides excellent stability in product quality.

Here, it is also possible for the baffle plate, etc., to be arranged in the dry distillation furnace at an angle with respect to the falling direction of the fixed carbon. Further, the metal mesh, the metal plate with a lot of holes may be installed all over the inside of the dry distillation mini-furnace, or may be installed only partially. In this case also, arrangement at an angle is possible. Further, as an application of these baffle plates, it is also possible to provide, instead of the baffle plates, pipe-shaped heating means in the furnace. By doing so, it becomes easy to make the in-bed temperature uniform, and it is possible to provide excellent product yield for the fixed carbon. In the case where a metal plate with a lot of holes is provided, the dried coal to undergo dry distillation stays on the metal plate, and is caused to fall while being agitated there by the dry distillation gas flowing as a countercurrent, so that it is possible to elongate the reaction time in the furnace, resulting in excellent product yield for the fixed carbon.

The invention according to a fourth aspect is the fixed carbon production device according to the third aspect, wherein the baffle plate is a holed structure at an angle not less than an angle of repose.

As a result of this arrangement, in addition to the effects obtained according to the third aspect, it is possible to obtain the following effect:

(1) Since the baffle plate is at an angle not less than an angle of repose, the fixed carbon does not stay on the baffle plate, making it possible to produce fixed carbon in a stable manner.

Here, the baffle plate may be one each chevron shape of which is mounted at an angle not less than an angle of repose. The thickness and number of the baffle plates may be selected as appropriate.

The invention according to a fifth aspect is the fixed carbon production device according to one of the first through fourth aspects, wherein, at a fixed carbon extraction port at a bottom portion of the quench chamber, there are provided a rotary valve, and a means for sending high temperature steam or a carrier gas such as carbon dioxide gas or nitrogen gas.

As a result of this arrangement, in addition to the effects obtained according to one of the first through fourth aspects, it is possible to obtain the following effect:

(1) Since a rotary valve is provided at the fixed carbon extraction port in the lower portion of the quench chamber, it is possible to appropriately select the place for sending gas into the dry distillation furnace without having to mind gas leakage through the extraction port, so that the device provides excellent variety.

The invention according to a sixth aspect is the fixed carbon production device according to the fifth aspect, wherein the rotary valve has a vane with holes.

As a result of this arrangement, according to the effect obtained according to the fifth aspect, it is possible to obtain the following effects:

(1) Since the rotary valve at the fixed carbon extraction port in the lower portion of the quench chamber is equipped with a vane with holes, it is possible to introduce gas from the extraction port; further, the fixed carbon is agitated by the gas at the bottom portion of the quench chamber, so that it is possible to prevent clogging in the lower portion; thus, the device provides excellent operation stability; and (2) Due to the arrangement in which the vane of the rotary valve is equipped with holes, when the dry distillation gas is introduced from the fixed carbon extraction port side, the fixed carbon flows in the lower portion to promote the reaction, so that the device provides an excellent yield of the fixed carbon.

Here, the hole of the vane of the rotary valve may be of an appropriate size small enough to prevent passing-through of fixed carbon. Further, the hole may be of any type as long as it is for passing gas, and there is no restriction regarding the number of the holes; further, it is also possible to employ a porous material for the vane.

The invention according to a seventh aspect is the fixed carbon production device according to one of the first through sixth aspects, wherein the raw material coal is a dried coal obtained through drying of low rank coal to a moisture content of not more than 20 mass %.

As a result of this arrangement, it is possible to obtain the following effects in addition to the effects obtained according to one of the first through sixth aspects:

(1) Since dried coal obtained through drying of low rank coal to a moisture content of not more than 20 mass % undergoes dry distillation, it is possible to reduce the input heat value, so that the device provides excellent energy efficiency;

(2) Through the drying, a reduction in specific gravity is achieved, and, inclusive of the heat value for vaporizing the moisture, it is possible to design the dry distillation furnace compact, so that the device provides excellent resource-saving efficiency. Further, it is possible to make the dry-distilled gas recycle system, etc., of the dry distillation furnace compact, so that the device provides excellent resource-saving efficiency; and (3) Since the moisture content is reduced to not more than 20 wt %, the influence of the expansion due to the moisture in the dry distillation furnace is reduced, so that it is possible to prevent deformation of or damage to the device.

Here, as the drying condition for the low rank coal to be dried, it is desirable to perform the drying of low rank coal of a moisture content of exceeding about 20% in an inert gas atmosphere of nitrogen gas, etc., which is at low temperature (30° C. to 80° C.) and which is of low humidity (RH 70% to 0%). Further, the moisture content of the low rank coal used for dry distillation may be of 20 mass % or less. It is not necessary for all the coal used to be low rank coal; it is also possible to add high rank coal the moisture content of which is less than about 20 mass %. In an experiment, it was possible to reduce to a moisture content of 16 mass %. Thus, by reducing the moisture content of low rank coal to ⅓ or less, it is possible to substantially improve the transportation efficiency. Further, dry distillation is performed to obtain fixed carbon, whereby it is possible to prevent spontaneous combustion, thus achieving an improvement in safety. (Hereinafter, low rank coal used for dry distillation of 20 mass % or less will be referred to as dried coal).

As the inert gas, nitrogen gas is preferably employed. The nitrogen gas used may be the one that is separated in an oxygen separator. The nitrogen gas may be heated in an air preheater which is heated with very hot water of the condenser. In this case, since the oxygen concentration is low, it is possible to prevent the low rank coal, which is spontaneously oxidized and readily increases in temperature as well as readily catches fire, from catching fire, and dry the coal at higher temperatures. Furthermore, since the nitrogen gas separated in the oxygen separator has a low relative humidity, the coal may be dried with increased efficiency. Furthermore, since waste heat is utilized without requiring additional heat energy, the system may be made environmentally friendly and excellent in energy-saving efficiency. In addition, it is possible to recycle clean water from the high humidity exhaust gas discharged through drying, thus making effective use of water.

The invention according to an eighth aspect is the fixed carbon production device according to one of the first through seventh aspects, wherein there is provided on the input side a crushing process for crushing the raw material coal, and wherein the grain size of the raw material coal is adjusted to 0.1 µm to 5 mm.

As a result of this arrangement, it is possible to obtain the following effects in addition to the effects obtained according to one of the first through seventh aspects:

(1) By crushing the coal to a grain size of 0.1 µm to 5 mm, it is possible to shorten the drying time, so that the device provides excellent energy efficiency; and (2) Further, through the stabilization of the grain size, it is also possible to stabilize the quality of the fixed carbon, which is the end product; thus, the device provides excellent product yield.

Here, the low rank coal is coarsely crushed, as preprocessing before being dried, into controlled grain sizes of 0.1 µm to 5 mm. Crushing into grain sizes of 0.1 µm to 5 mm may simplify the drying so as to shorten the time for drying. When the grain size is less than 0.1 µm, particle size reduction progresses, and the yield of the fixed carbon tends to be reduced, which is not desirable. Further, as the grain size becomes larger than 5 mm, the effect of shortening the drying time is reduced, which is not desirable.

The invention according to a ninth aspect is the fixed carbon production device according to one of the first through eighth aspects, wherein there is provided a combustion means for burning at least a part of the hydrocarbon gas and fixed carbon obtained through dry distillation of the raw material coal, and wherein the heating means utilizes the exhaust gas or waste heat of the combustion means.

As a result of this arrangement, it is possible to obtain the following effects in addition to the effects obtained according to one of the first through eighth aspects:

(1) Since it uses the exhaust gas or waste heat obtained by the combustion means, the device provides excellent energy efficiency; and (2) By using the exhaust gas of the combustion means as gasified gas in the dry distillation furnace, it is possible to provide excellent energy efficiency. Further, since exhaust gas, which is of a small oxygen amount is used, it is possible to perform the dry distillation safely; thus, the device provides excellent safety.

Here, as the combustion means, there is preferably used a combustion boiler using as the fuel the hydrocarbon gas and fixed carbon obtained at the dry distillation furnace. The combustion temperature of the combustor is adjusted to 800° C. to 900° C. As a result of this arrangement, it is possible to reduce the use amount of the special material withstanding high temperature which is used as the furnace material. When there is provided a combustor, it is also possible to use this exhaust gas as the gasified gas of the dry distillation furnace. When the combustor is a boiler for rotating the turbine of a power generating apparatus, it is also possible to supply this steam to the heating means of the dry distillation furnace, so that it is possible to build a system excellent in heat efficiency.

Advantageous Effects of Invention

As described above, the fixed carbon production device of the present invention and the combustion system equipped with the same provide the following advantageous effects:

According to the invention of the first aspect, the following effects are obtained:

(1) Indirect heating by a high temperature heat medium is possible, it is easy to make the temperature in the dry distillation furnace uniform, and it is possible to provide an excellent fixed carbon yield. Further, there are provided a dry distillation unit equipped with many rows of dry distillation mini-furnaces, and a dry distillation furnace equipped with many rows of the dry distillation units, so that it is possible to provide a fixed carbon production device excellent in mass production efficiency; and (2) It is possible to provide a fixed carbon production device excellent in energy-saving efficiency which uses, as the heat exchange medium of the dry distillation furnace, unlike direct heating in which the exhaust gas of the combustor is supplied, but indirect heating, whereby it is possible to utilize to the utmost the heat value per unit volume of the volatile content generated.

According to the invention of the second aspect, the following advantageous effects are obtained in addition to the effects of the first aspect:

(1) It is possible to provide a fixed carbon production device in which the hydrocarbon gas (volatile content) is removed, making it possible to convert to high rank coal, making it possible to obtain a high rank coal of a fuel ratio of 2 or more, and which provides excellent cost-saving efficiency in terms of the cost of the device itself and the input heat value; and (2) Dry distillation is possible while retaining heavy oil, so that there are no problems such as the clogging of the reactor, thus making it possible to provide a fixed carbon production device excellent in operation stability.

According to the invention of the third aspect, it is possible to obtain the following advantageous effects in addition to the effects of the first or second aspect:

(1) To adjust the ease of flowing for each dry distillation mini-furnace, it is possible to appropriately arrange a baffle plate, etc., making it possible to stabilize the product uniformity and the yield of the fixed carbon, thus making it possible to provide a fixed carbon production device excellent in product yield; and (2) Inside the furnace, the baffle plate, etc., serves as a reinforcing member, so that it is possible to provide a fixed carbon production device excellent in strength.

According to the invention of the fourth aspect, it is possible to obtain the following advantageous effect in addition to the effects of the third aspect:

(1) Fixed carbon does not stay on the baffle plate, so that it is possible to provide a fixed carbon production device excellent in production stability for the fixed carbon.

According to the invention of the fifth aspect, it is possible to obtain the following advantageous effect in addition to the effects of one of the first through fourth aspects:

(1) It is possible to appropriately select the place for sending gas into the dry distillation furnace without having to pay attention to gas leakage through the extraction port, so that it is possible to provide a fixed carbon production device excellent in variety.

According to the invention of the sixth aspect, it is possible to obtain the following advantageous effects in addition to the effect of the fifth aspect:

(1) It is possible to introduce gas from the extraction port, and the fixed carbon is agitated by the gas at the bottom portion of the quench chamber, so that it is possible to prevent clogging in the lower portion, making it possible to provide a fixed carbon production device excellent in operation stability; and (2) The fixed carbon flows in the lower portion to promote the reaction, so that it is possible to provide a fixed carbon production device excellent in the yield of the fixed carbon.

According to the invention of the seventh aspect, it is possible to obtain the following advantageous effects in addition to the effects of one of the first through sixth aspects:

(1) It is possible to provide a fixed carbon production device excellent in energy efficiency which allows a reduction in the input heat value; and (2) It is possible to provide a fixed carbon production device excellent in resource-saving efficiency which is reduced in specific gravity through drying, and which allows compact design of the dry distillation furnace inclusive of the heat value for vaporizing the moisture. Further, it is possible to provide a fixed carbon production device excellent in resource-saving efficiency which allows compact design of the dry distillation gas recycle system, etc., of the dry distillation furnace.

According to the invention of the eighth aspect, it is possible to obtain the following advantageous effects in addition to the effects of one of the first through seventh aspects:

(1) It is possible to provide a fixed carbon production device excellent in energy efficiency which makes it possible to shorten the drying time; and (2) It is possible to provide a fixed carbon production device excellent in product yield which makes it possible to stabilize the quality of the product fixed carbon through stabilization of the grain size as well.

According to the invention of the ninth aspect, it is possible to obtain the following advantageous effect in addition to the effects of one of the first through eighth aspects:

(1) It is possible to provide a fixed carbon production device excellent in safety which is excellent in energy efficiency and which makes it possible to perform dry distillation safely.

DESCRIPTION OF EMBODIMENTS

In the following, the mode for carrying out the present invention will be described with reference to the drawings.

Embodiments

Figure 1:
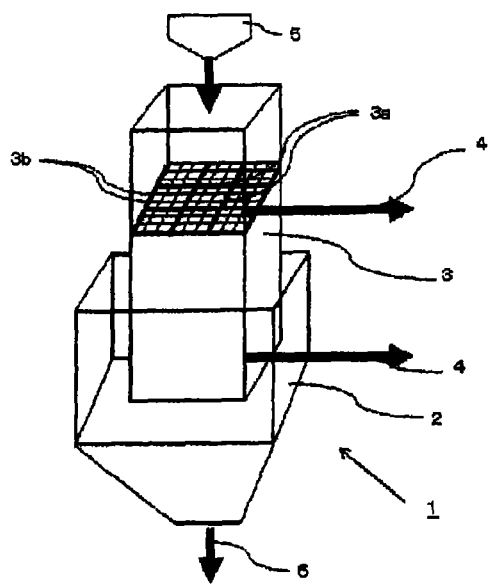
FIG. 1 is a schematic diagram illustrating a fixed carbon production device according to an embodiment.

FIG. 1 is a schematic diagram illustrating a fixed carbon production device according to an embodiment.

In the drawing, 1 denotes a fixed carbon production device; 2 denotes a quench chamber for cooling and receiving fixed carbon (product dry-distilled char); 3 denotes a dry distillation furnace including a dry distillation unit which is erected on the upper portion of the quench chamber and which is partitioned by a separating wall portion described below, dry distillation mini-furnaces partitioned by partition plates described below provided in the dry distillation unit, steam piping and high temperature waste gas piping which are heated to a temperature of 500° C. to 600° C. are provided on the inner surface of the dry distillation furnace, the separating wall, and the partition plate, and dry-distills fed dried brown coal at a temperature of 350° C. to 500° C.; 3a denotes the separating wall arranged vertically from the upper portion to the lower portion of the dry distillation furnace 3 to divide the dry distillation furnace into rectangular dry distillation units; 3b denotes partition plates arranged vertically from the upper portion to the lower portion of the dry distillation furnace to divide each dry distillation unit divided by the separating wall into rectangular dry distillation mini-furnaces; 4 denotes dry distillation gas piping for recycling dry distillation gas produced through dry distillation which is provided in the upper portion or the lower portion; 5 denotes a dried brown coal feeding device for feeding into the dry distillation furnace dried brown coal obtained through drying of low rank coal to a moisture content of not more than 20 mass %; and 6 denotes a path for fixed carbon (product dry-distilled char).

The fixed carbon production device according to the embodiment arranged as described above provides the following effects:

(1) Each of the dry distillation mini-furnaces is equipped with a pipe-shaped heating means, so that it is possible to perform indirect heating by high temperature heat medium, it is easy to make the temperature in the dry distillation furnace uniform, and it is possible to prevent generation of heating spots. Further, there are provided dry distillation units each equipped with many rows of dry distillation mini-furnaces, and a dry distillation furnace equipped with many rows of the dry distillation units, so that the device is excellent in rigidity and durability;

(2) Since there are provided dry distillation units each formed with many rows of dry distillation mini-furnaces, and a dry distillation furnace formed with many rows of dry distillation units, the device is of high rigidity and undergoes no deformation even when pressure is applied to the inside of the furnace due to generation of a volatile component in the dry distillation furnace or due to expansion of the raw material coal in the dry distillation furnace; thus the device is excellent in operation stability;

(3) Since a pipe-shaped heating means is formed, it is possible to perform heating in a stable manner by using high temperature heat medium such as steam, so that the device is excellent in operation stability;

(4) There is provided a quench chamber for collecting fixed carbon in the lower portion of the dry distillation furnace, so that it is possible to cool the fixed carbon reformed in the dry distillation furnace, and to collect the product dry-distilled char in a stable manner;

(5) Since the dry distillation is performed at 350° C. to 500° C., the hydrocarbon gas (volatile content) is removed, and it is possible to convert to high rank coal, making it possible to obtain a high rank coal of a fuel ratio of 2 or more;

(6) Since it is possible to perform the dry distillation at a low temperature of 350° C. to 500° C., the device is excellent in cost-saving efficiency in terms of the cost of the device itself and the input heat value; and (7) Since it is possible to perform the dry distillation while retaining heavy oil, there are no problems such as the clogging of the reactor.

Experiment Example 1 . . . Dry Distillation Test

In experiment example 1, the dry distillation temperature of the moving bed indirect heating dry distillation furnace was examined.

Figure 2:
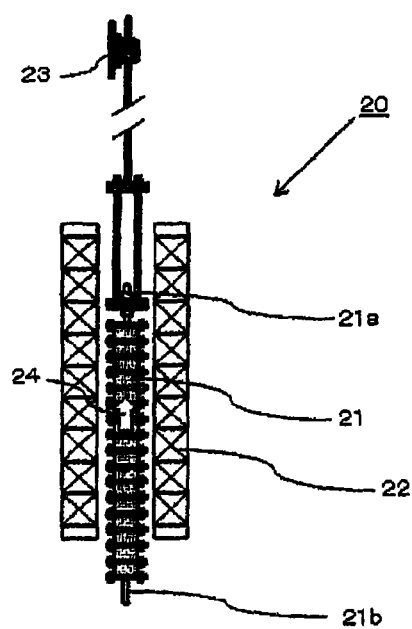
FIG. 2 is a schematic diagram illustrating a simulated moving bed indirect heating dry distillation furnace.

FIG. 2 is a schematic view of the simulated moving bed indirect heating dry distillation furnace used for collecting test data of the present embodiment.

In FIG. 2, 20 denotes a simulated moving bed indirect heating dry distillation furnace; 21 denotes a container furnace filled with a brown coal specimen (which was obtained through pre-heating and drying Loy Yang brown coal (raw coal) in the atmosphere and at room temperature to reduce its moisture content to around 20 mass %, setting the grain sizes to 0.3 mm to 0.5 mm through crushing/classification, drying the resultant coal in an inert gas atmosphere at 110° C., and removing the moisture therefrom) and partitioned in the length direction and the perpendicular direction (horizontal plane direction) with a SUS mesh; 21a denotes an inert gas feeding port through which $N_2$ gas is caused to flow in at a rate of 200 ml/min to create an inert gas atmosphere in the container furnace 21; 21b denotes an inert gas outlet for the inert gas input from the inert gas feeding port 21a; 22 denotes an electric furnace arranged in many stages in order to form a temperature distribution; 23 denotes a motor for moving the container furnace 21 inside the electric furnace 22 at a constant speed for spuriously preparing the data regarding the carbon flowing down in the furnace; and 24 denotes the moving direction of the container furnace.

Figure 3:
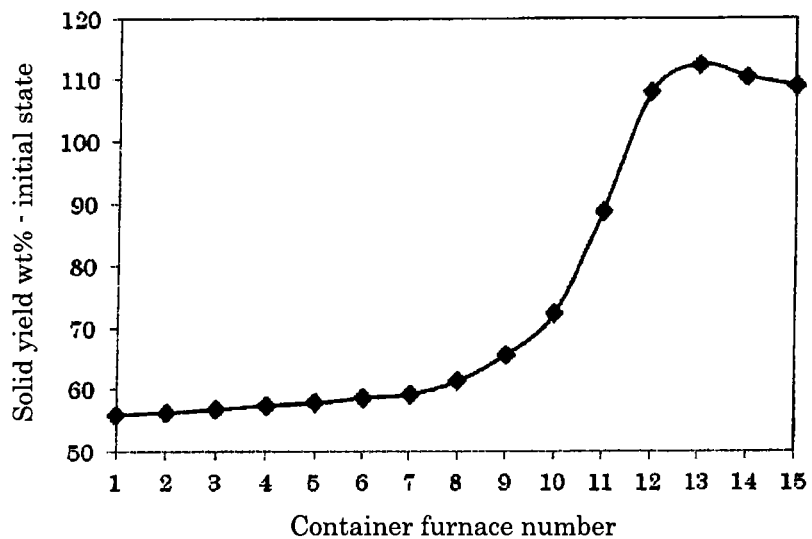
FIG. 3 is a graph illustrating analysis results of dry-distilled coal according to dry distillation temperatures.

The inert gas flows from the inert gas feeding port 21a toward the inert gas outlet 21b in FIG. 2 (from the upper side toward the lower side in FIG. 3).

The simulated moving bed indirect heating dry distillation furnace 20 is a device simulating the brown coal conversion characteristics and the gasification characteristics in the dry distillation. The container furnaces 21 of cylindrical reactors formed of SUS are fixed in series in 15 stages, and these are raised by the motor 23 in the direction of the moving direction 24 from the lower portion toward the upper portion of the vertical electric furnaces 22 arranged in a number of stages, whereby there was obtained the test data when the brown coal filled in the container furnace 21 flowed down from the upper portion to the lower portion of the moving bed. From the upper side in FIG. 2, the container furnaces 21 were numbered as the first, second, . . . , to 15th container. There were provided nine electric furnaces 22; and the first through fourth electric furnaces as ordered from the lower side in FIG. 2 were set to 165° C., the fifth furnace was set to 300° C., the sixth furnace was set to 400° C., the seventh furnace was set to 500° C., the eighth furnace was set to 600° C., and the ninth furnace was set to 700° C., respectively. It is noted that the container furnaces 21 were raised at a rate of 6.9 ram/min within the electric furnaces 22. The temperature rise rate at this time of the container furnaces 21 was about 10° C./min. Of the fifteen container furnaces 21, the container furnaces 21 which have passed the electric furnace uppermost portion were the first through sixth container furnaces 21.

FIG. 3 and (Table 1) are graphs showing the dry-distilled coal analysis results according to the dry distillation temperatures. More specifically, FIG. 3 shows the solid yields of the respective containers obtained based on the mass of the solid remaining after the completion of the experiment using the simulated moving bed indirect heating dry distillation furnace 20 of FIG. 2.

At this time, the first through sixth of the container furnaces 21 have passed the electric furnaces; the seventh through eleventh container furnaces 21 correspond to 200° C. to 595° C. of the thermal decomposition zone; and the 12th to 15th container furnaces 21 are the portions heated at 165° C. and they are at a temperature of about 140° C.

The carbide yield at the first container furnace 21 was 56 mass %; the carbide yield gradually increased from the second to the sixth container furnaces 21, i.e., the lower the stage; and the yield attained 58.7 mass % at the sixth container furnace 21. This resulted from the volatile component containing heavy oil generated from the upper stage container coming into contact with the brown coal carbide and half-carbide of the lower stage, with the carbide yield increasing due to sorption of the heavy oil and co-carbonization of the heavy oil and the brown coal. Further, from the 12th container furnace 21 onward, there was recognized an increase in weight by 10% to 20% of deadweight probably attributable mainly to the sorption of the heavy oil. On the downstream side of the reactor (the 12th to 15th container furnaces 21), the production gas and the condensation component were recycled, and the recycle rate of these generated products was 99% or more. As a result of the analysis of the recycled condensation component, it was found that the high boiling point heavy oil condensed due to the presence of a low temperature portion in the furnace; further, it is possible to perform selective production of light oil components through supply of heavy oil due to the brown coal particles present here; and, as shown in FIG. 3 and (Table 1), in the temperature range of 200° C. to 595° C., dry distillation rapidly progressed in the moving bed indirect heating dry distillation furnace, making it possible to retain the heavy oil component in the fixed carbon.

TABLE 1

| | Container furnace number | | | | | | | |
|---|---|---|---|---|---|---|---|---|
| | 1 | 2 | 3 | 4 | 5 | 6 | 7 | 8 |
| Solid yield (mass %) | 56 | 56.4 | 56.9 | 57.5 | 57.9 | 58.7 | 59.3 | 61.4 |
| | Container furnace number | | | | | | | |
| | 9 | 10 | 11 | 12 | 13 | 14 | 15 | — |
| Solid yield (mass %) | 65.7 | 72.4 | 88.9 | 107.9 | 112.4 | 110.4 | 108.9 | — |

Experiment Example 2 . . . Evaluation Test Through Thermogravimetric Analysis

In experiment example 2, the dry distillation temperature was examined through thermogravimetric analysis.

Figure 4:
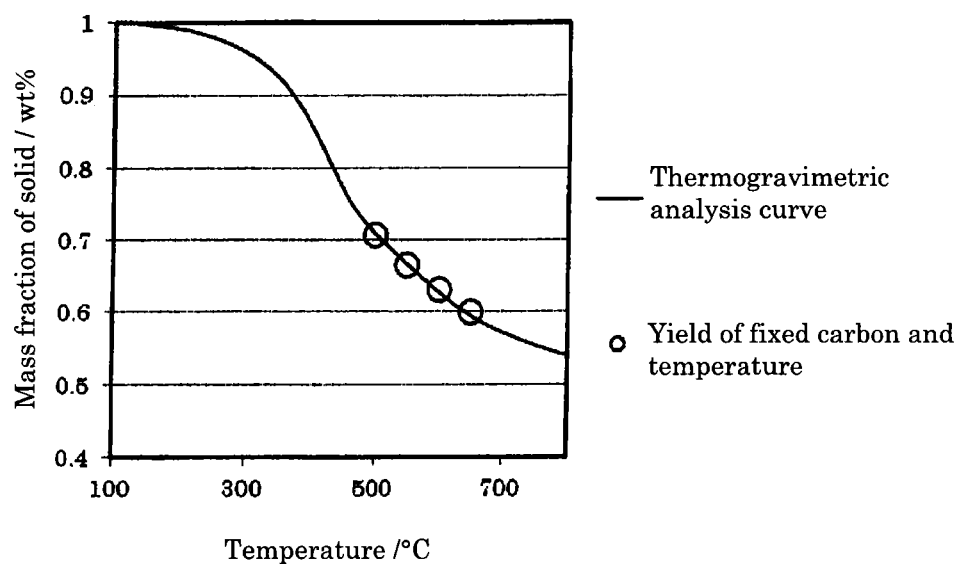
FIG. 4 is a graph illustrating thermogravimetric analysis results of dry-distilled coal according to dry distillation temperatures.

FIG. 4, (Table 2), and (Table 3) are graphs showing the results of the dry-distilled coal thermogravimetric analysis according to the dry distillation temperatures. More specifically, in order to check the dry distillation temperature through thermal decomposition of brown coal, Loy Yang brown coal (raw coal) was pre-heated and dried at room temperature and in the atmosphere to reduce its moisture content to around 20 mass %; then, its grain sizes were set to 0.3 mm to 0.5 mm through crushing/classification, and the coal was dried in an inert gas atmosphere at 110° C. to remove moisture therefrom; the resultant coal was measured by using a thermogravimetric analysis apparatus (EXSTAR TG/DTA 6000 manufactured by SII Nanotechnology Inc.) to obtain the following results.

As shown in FIG. 4, (Table 2), and (Table 3), it is recognized that the brown coal weight began to decrease at around 350° C., with the dry distillation being conspicuous from this temperature. Further, in a stationary bed dry distillation furnace, a similar specimen was dry-distilled in a nitrogen stream at 500° C., 550° C., 600° C., and 650° C., with the temperature rise rate being 10° C./min, and the retaining time at the peak temperature being zero seconds. The relationship between the fixed carbon yield and the temperature at this time is plotted in FIG. 4. By checking the graph, it is understood that the results of the thermogravimetric analysis and the temperature definition in the dry distillation furnace are in a satisfactory correlationship. The results of the dry-distilled coal thermogravimetric analysis in FIG. 4 are plotted in (Table 2), and the relationship between the fixed carbon yield and temperature in FIG. 4 is plotted in (Table 3).

TABLE 2

| Temperature (° C.) | 200 | 300 | 400 | 500 | 600 | 700 | 800 |
|---|---|---|---|---|---|---|---|
| Weight change amount (mass %) | 0.99 | 0.95 | 0.85 | 0.7 | 0.62 | 0.57 | 0.53 |

TABLE 3

| | Peak temperature (° C.) | | | |
|---|---|---|---|---|
| | 500 | 550 | 600 | 650 |
| Yield of fixed carbon | 0.71 | 0.67 | 0.63 | 0.6 |

Experiment Example 3 . . . High Rank Conversion Temperature Demonstration Test

In experiment example 3, the requisite temperature for conversion from low rank coal to high rank coal was examined.

Figure 5:
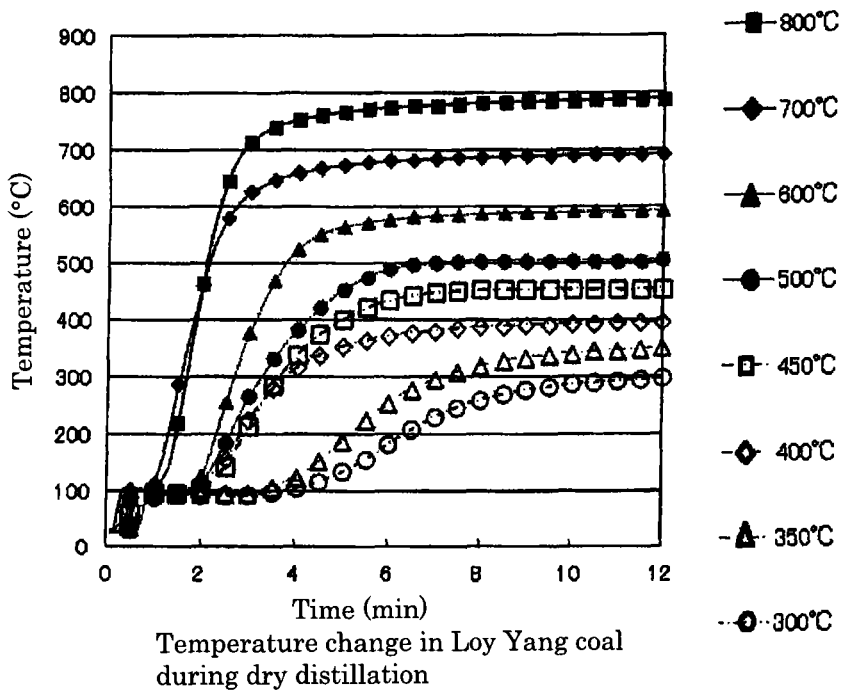
FIG. 5 is a graph illustrating temperature change in brown coal in a dry distillation furnace.

FIG. 5 and (Table 4) are graphs showing temperature changes in brown coal inside the dry distillation furnace. More specifically, Loy Yang brown coal (raw coal) was placed in a horizontally installed tubular furnace with $N_2$ gas circulating therethrough; in this state, the in-furnace temperature was raised to each measurement temperature, and the temperature change time at that time and each temperature were measured.

As shown in FIG. 5, it is understood that even after the moisture had vaporized at around 100° C., the temperature increased gradually; even when the set temperature was 300° C., there was a latent heat component, which shows that conversion to high rank coal occurred.

TABLE 4

| | | | | Reaction time (min) | | | | | | | | |
|---|---|---|---|---|---|---|---|---|---|---|---|---|
| | | | | 1 | 2 | 3 | 4 | 5 | 6 | 7 | 8 | 9 | 10 |
| Set temperature (° C.) | 300 | Specimen temperature (° C.) | | 88 | 93 | 93 | 104 | 133 | 182 | 229 | 259 | 276 | 287 |
| | 350 | | | 96 | 95 | 95 | 124 | 187 | 254 | 296 | 319 | 333 | 341 |
| | 400 | | | 96 | 115 | 225 | 315 | 352 | 371 | 381 | 386 | 390 | 392 |
| | 500 | | | 97 | 111 | 265 | 381 | 453 | 489 | 500 | 500 | 500 | 500 |
| | 600 | | | 101 | 127 | 376 | 525 | 565 | 578 | 584 | 588 | 590 | 592 |
| | 700 | | | 114 | 462 | 626 | 661 | 675 | 682 | 685 | 688 | 690 | 691 |
| | 800 | | | 102 | 464 | 715 | 753 | 767 | 774 | 778 | 782 | 784 | 786 |

Experiment Example 4 . . . Dry Distillation Temperature Effect Test

In experiment example 4, dry distillation temperature and the performance of the resultant fixed carbon were examined.

Figure 6:
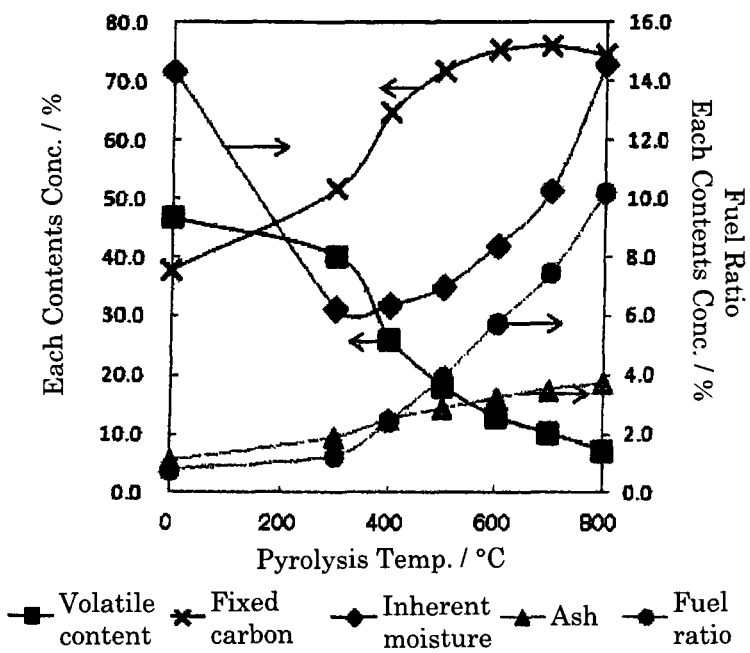
FIG. 6 is a graph illustrating changes in various combustion-related components of fixed carbon at a brown coal dry distillation processing temperature.
Figure 7:
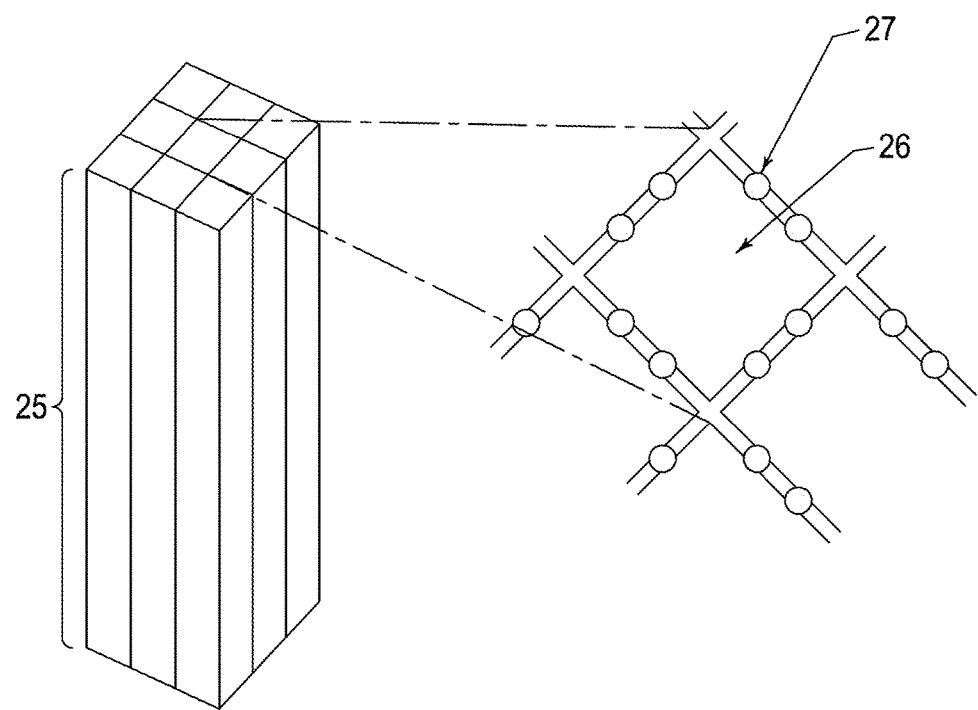
FIG. 7 is a diagram illustrating a dry distillation unit 25 and a dry distillation mini-furnace 26 as described herein. Although one of the dry distillation mini-furnace 26 in the center part of the dry distillation unit 25 is shown as an example, 3×3 rows of dry distillation mini furnaces 26 are provide in the dry distillation unit 25 as described herein. In the blow-up at right, the arrangement of the pipe heating means 27 between the adjacent dry distillation mini-furnaces 26 is shown.
Figure 8:
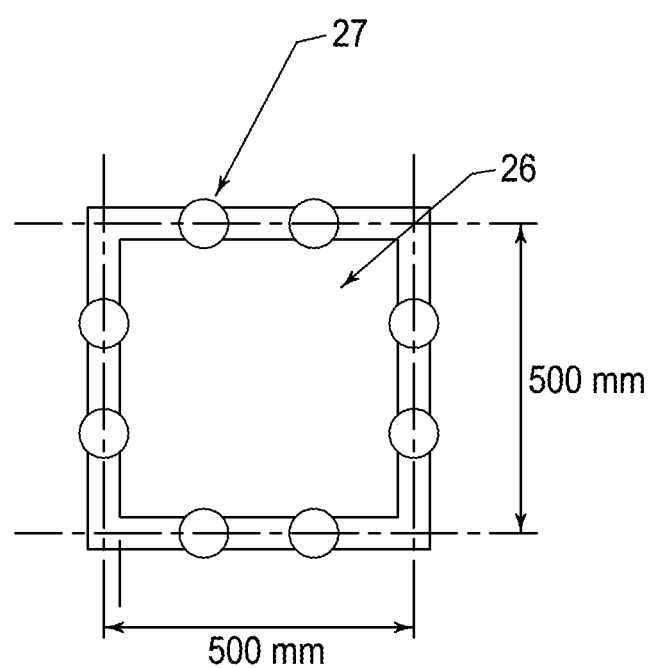
FIG. 8 is a diagram providing an enlarged view of one of the dry distillation mini-furnaces 26 surrounded by the pipe heating means 27 between the adjacent dry distillation mini-furnaces 26. For ease of visualization, the center line is added along with an exemplification of the size for reference.

FIG. 6 and (Table 5) are graphs showing changes in the combustion-related components of the fixed carbon at the brown coal dry distillation processing temperatures. More specifically, Loy Yang brown coal (raw coal) was pre-heated and dried at room temperature and in the atmosphere, reducing its moisture content to around 20 mass %; the resultant coal was placed in a horizontally installed tubular furnace with $N_2$ gas circulating therethrough; in this state, the in-furnace temperature was raised to 400° C., 600° C., 700° C., and 800° C., and the inherent moisture, volatile content, ash, fixed carbon yield (%), and the fuel ratio at that time were measured.

As shown in FIG. 6 and (Table 5), in the coal processed at 400° C., the fuel ratio was 2.5, thus showing that there has been realized a fuel ratio on the order of bituminous coal like Newlands coal.

TABLE 5

| | Processing temperature (° C.) | | | | Newlands coal |
|---|---|---|---|---|---|
| | 400 | 600 | 700 | 800 | |
| Inherent moisture (mass %) | 6.3 | 8.4 | 10.3 | 14.6 | 2.7 |
| Volatile content (mass %) | 26.3 | 13.0 | 10.2 | 7.3 | 27.3 |
| Ash (mass %) | 2.5 | 3.3 | 3.6 | 3.7 | 14.7 |
| Fixed carbon (mass %) | 64.8 | 75.3 | 76.0 | 74.4 | 55.3 |
| Fuel ratio | 2.5 | 5.8 | 7.5 | 10.2 | 2 |

INDUSTRIAL APPLICABILITY

The present invention provides a fixed carbon production device which performs thermal decomposition and gasification while moving dried low rank coal in a dry distillation furnace and which makes it possible to recycle fixed carbon, hydrocarbon gas, etc.

REFERENCE SIGNS LIST

1 Fixed carbon production device
2 Quench chamber
3 Dry distillation furnace
3a Separating wall
3b Partition plate
4 Dry distillation gas piping
5 Dried brown coal
6 Fixed carbon
20 Simulated moving bed indirect heating dry distillation furnace
21 Container furnace
21a Inert gas feeding port
21b Inert gas outlet
22 Electric furnace
23 Motor
24 Moving direction
25 Dry distillation unit
26 Dry distillation mini-furnace
27 Pipe heating means

The invention claimed is:

1. A fixed carbon production device comprising: a quench chamber for collecting fixed carbon; a dry distillation furnace which is erected and fixed in the quench chamber; a dry distillation unit which is partitioned into a rectangular or a polygonal shape in the vertical direction on a horizontal cross-section in the dry distillation furnace by a separating wall from an upper portion to a lower portion; a dry distillation mini-furnace which is partitioned into a rectangular or a polygonal shape in the vertical direction on the horizontal cross-section in the dry distillation unit by a partition from an upper portion to a lower portion; a pipe heating means which is arranged on the separating wall of the dry distillation unit and the partition of the dry distillation mini-furnace; a collection path for collecting fixed carbon produced in the quench chamber by feeding raw material coal from an upper portion of the dry distillation unit and performing dry distillation in each of the dry distillation mini-furnaces by the pipe heating means; and at a bottom portion of the quench chamber a fixed carbon extraction port comprising a rotary valve, and a means for sending high temperature steam or a carrier gas.

2. The fixed carbon production device according to claim 1, wherein a heating temperature of the dry distillation furnace is of 350° C. to 500° C.

3. The fixed carbon production device according to claim 1, wherein there are arranged in the dry distillation mini-furnace, a baffle plate, a metal mesh, and a metal plate with holes.

4. The fixed carbon production device according to claim 3, wherein the baffle plate is a holed structure at an angle not less than an angle of repose.

5. The fixed carbon production device according to claim 1, wherein the carrier gas is carbon dioxide gas or nitrogen gas.

6. The fixed carbon production device according to claim 1, wherein the rotary valve has a rotating vane with holes.

7. The fixed carbon production device according to claim 1, wherein the raw material coal is a dried coal obtained through drying of low rank coal to a moisture content of not more than 20 mass %.

8. The fixed carbon production device according to claim 1, wherein the grain size of the raw material coal is adjusted to 0.1 µm to 5 mm.

9. The fixed carbon production device according to claim 1, wherein there is provided a combustion means for burning at least a part of the hydrocarbon gas and fixed carbon obtained through dry distillation of the raw material coal, and wherein the heating means utilizes the exhaust gas or waste heat of the combustion means.

* * * * *